US011461431B2

(12) United States Patent
Chapin (10) Patent No.: US 11,461,431 B2
(45) Date of Patent: *Oct. 4, 2022

(54) WEB PAGE SELF DELETION (71) Applicant: Capital One Services, LLC, McLean, VA (US)

(72) Inventor: Ann C. Chapin, Powhatan, VA (US)

(73) Assignee: Capital One Services, LLC, McLean, VA (US)

( * ) Notice: Subject to any disclaimer, the term of this patent is extended or adjusted under 35 U.S.C. 154(b) by 259 days.

This patent is subject to a terminal disclaimer.

(21) Appl. No.: 16/864,660

(22) Filed: May 1, 2020

(65) Prior Publication Data
US 2020/0257745 A1    Aug. 13, 2020

Related U.S. Application Data (63) Continuation of application No. 16/196,134, filed on Nov. 20, 2018, now Pat. No. 10,678,884.

(51) Int. Cl.
G06F 16/958 (2019.01)
G06F 16/11 (2019.01)
G06F 16/907 (2019.01)
G06F 16/957 (2019.01)

(52) U.S. Cl.
CPC .......... G06F 16/958 (2019.01); G06F 16/113 (2019.01); G06F 16/907 (2019.01); G06F 16/9574 (2019.01)

(58) Field of Classification Search
CPC .. G06F 16/958; G06F 16/907; G06F 16/9574; G06F 16/113
See application file for complete search history.

(56) References Cited

U.S. PATENT DOCUMENTS

2012/0150911 A1* 6/2012 Arquie ................. G06F 3/0482
                                                       707/E17.03
2013/0013859 A1   1/2013 Zhu et al.
2016/0042179 A1   2/2016 Weingarten et al.

* cited by examiner

Primary Examiner — Truong V Vo
(74) Attorney, Agent, or Firm — DLA Piper LLP US (57) ABSTRACT Code for a page may include data indicating a time at which the page was most recently updated, the time at which the page was most recently updated may be independent of any access times. The processor may identify the data indicating the time at which the page was most recently updated and may determine that the time is earlier than a threshold time for the page. In response to the determining, the processor may force retrieval of a new version of the page from a network source and load the new version of the page in a browser, retrieve a new version of the page from a page server and store the new version of the page in the cache, and/or archive the page in response to the determining. The archiving may make the page unavailable to a client device through a network.

20 Claims, 6 Drawing Sheets

WEB PAGE SELF DELETION

CROSS-REFERENCE TO RELATED APPLICATION INFORMATION

This application claims priority to U.S. patent application Ser. No. 16/196,134, filed Nov. 20, 2018, the entirety of which is incorporated herein by reference

BACKGROUND

Client devices and/or proxy servers receive web page data from host servers and, in many cases, cache the data. For example, the first time a device accesses a particular web page, it may cache the data locally so it can load the web page faster in the future. However, the host server may update the web page, causing the cached data to become stale. In some cases, the client device and/or proxy server may continue to use the cached web page even after the host server has updated the web page, delivering outdated information to the end user.

SUMMARY OF THE DISCLOSURE

Some embodiments described herein may include a method of automatically loading a most recent version of a page. The method may include identifying, by the processor, data within code for the page indicating a time at which the page was most recently updated. The method may include determining, by the processor, that the time is earlier than a threshold time for the page. The method may include forcing, by the processor, retrieval of a new version of the page from a network source in response to the determining. The method may include loading, by the processor, the new version of the page in a browser.

In some embodiments, the starting may include retrieving the code for the page from a cache.

In some embodiments, the forcing may include automatically simulating at least one browser-based user input command. In some embodiments, the at least one browser-based user input command may include at least one keystroke. In some embodiments, the forcing may include detecting an identity of the browser and selecting the at least one browser-based user input command from among a plurality of browser-based user input commands based on the identity.

In some embodiments, the method may further include storing, by the processor, the new version of the page in a cache.

In some embodiments, the method may further include establishing, by the processor, the threshold time for the page.

In some embodiments, the threshold time may be different from a second threshold time for a second page.

Some embodiments described herein may include a method of automatically caching a most recent version of a page. The method may include retrieving, by the processor, code for the page from a cache. The method may include identifying, by the processor, data within the code for the page indicating a time at which the page was most recently updated. The method may include determining, by the processor, that the time is earlier than a threshold time for the page. The method may include retrieving, by the processor, a new version of the page from a page server in response to the determining. The method may include storing, by the processor, the new version of the page in the cache.

In some embodiments, at least the retrieving of the code and the identifying may be performed periodically.

In some embodiments, the method may further include establishing, by the processor, the threshold time for the page.

In some embodiments, the threshold time may be different from a second threshold time for a second page.

In some embodiments, the method may further include serving, by the processor, the new version of the page to a client device. In some embodiments, at least the retrieving of the code and the identifying may be performed in response to receiving a request to serve the page from the client device.

Some embodiments described herein may include a method of automatically archiving an expired version of a page. The method may include identifying, by the processor, data within code for the page indicating a time at which the page was most recently updated. The method may include determining, by the processor, that the time is earlier than a threshold time for the page. The method may include archiving, by the processor, the page in response to the determining. The archiving may include making the page unavailable to a client device through a network.

In some embodiments, at least the identifying may be performed periodically.

In some embodiments, the method may further include establishing, by the processor, the threshold time for the page.

In some embodiments, the threshold time may be different from a second threshold time for a second page.

In some embodiments, the archiving may include storing the code for the page in an archive.

In some embodiments, the archiving may include replacing the page with a new version of the page.

DETAILED DESCRIPTION OF SEVERAL EMBODIMENTS

Some embodiments disclosed herein may automatically load and/or cache most recent versions of web pages and/or other network-delivered data. Some embodiments disclosed herein my automatically archive expired web pages, which may include removing the expired web pages from network accessibility. One or more of these approaches may be used independently or in combination to ensure that a web page viewed by an end user is a most recently updated version.

Figure 1:
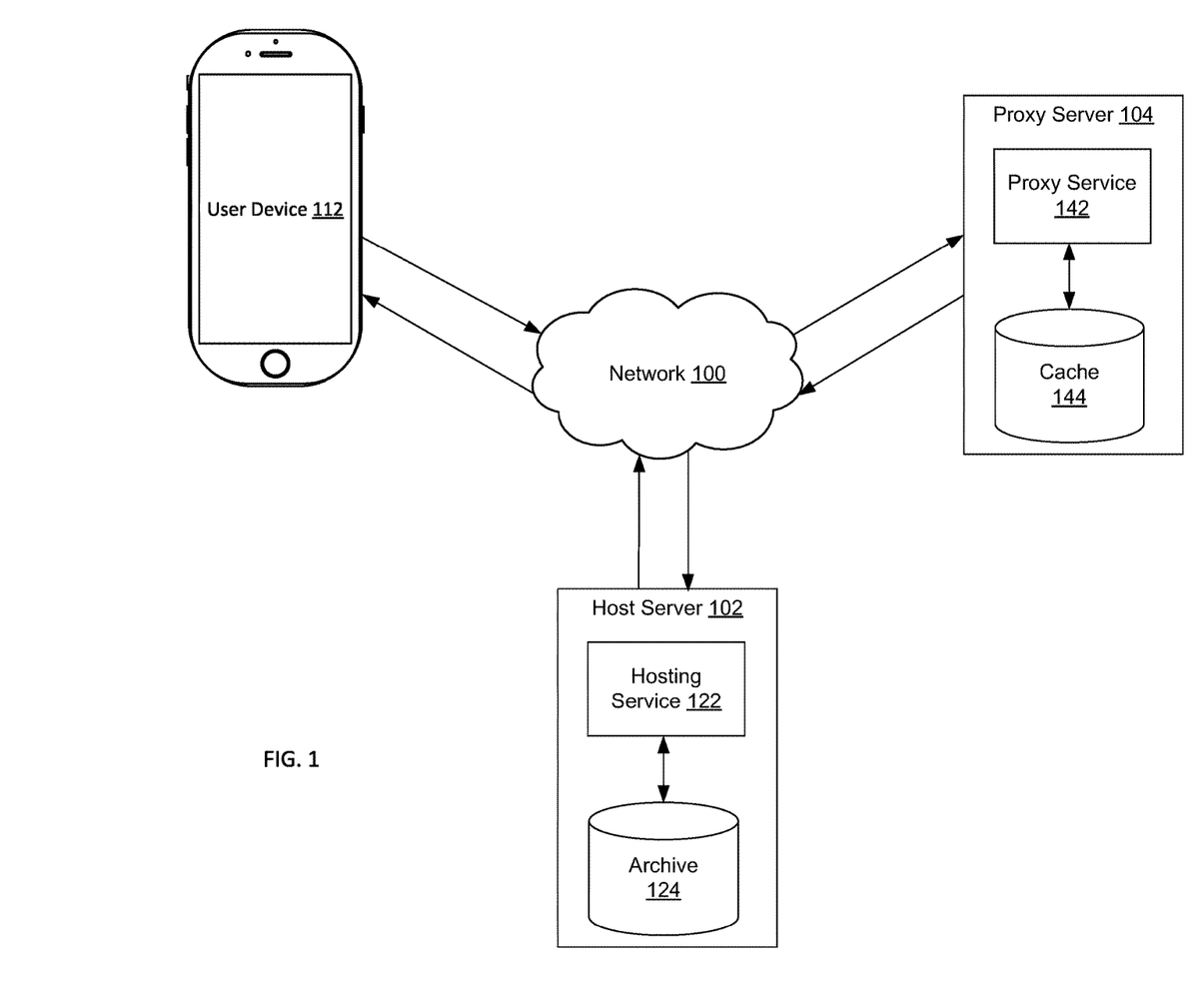
FIG. 1 shows a network according to an embodiment of the present disclosure.

FIG. 1 shows a network 100 according to an embodiment of the present disclosure. For example, network 100 may include the Internet and/or other public and/or private networks. Host server 102 may serve web pages to other computers through network 100. For example, proxy server 104 may cache web pages provided by host server 102 for future delivery to local devices. User device 112 may request web pages through network 100, receive the web pages from host server 102 and/or proxy server 104, and display the web pages to an end user.

Host server 102 may be an original source of a web page. For example, a developer or admin user or an automated process may create a web page and store the web page in memory of host server 102. Hosting service 122 may receive requests for the web page through network 100 and provide the web page to the requesting device through network 100 in response. For example, hosting service 122 may receive a request to provide the data available at a given URL and may provide the requested data. While web page data is used herein as an example, hosting service 122 may also serve other types of data (e.g., multimedia data, app interface data, etc.), and the same systems and methods used herein for web page loading and/or archiving may apply to other data types served by hosting service 122 through network 100 in various embodiments.

In some cases, the developer or admin user or the automated process may modify the web page. For example, hosting service 122 may replace some or all data accessed in response to a request for a page at a given URL, and future requests for that page may cause hosting service 122 to serve the new replacement data through network 100. In some embodiments, as described in detail below, hosting service 122 may archive old data that may have been superseded by new data in archive 124, which may preserve the old data while making it no longer accessible through network 100.

Proxy server 104 and/or user device 112 may be configured to request and receive data from host server 102. For example, proxy server 104 may be a local server configured to cache recently and/or frequently accessed data at a point in network 100 that is closer to an endpoint user device 112 than host server 102. For example, proxy service 142 may store cached data in cache 144, and may refresh the data in cache 144 periodically or upon request (e.g., and such refreshing may be infrequent). When user device 112 requests the data, proxy server 104 may respond instead of host server 102, in order to improve network speed and/or efficiency (although, in some cases, user device 112 may receive data directly from host server 102). Furthermore, user device 112 may locally cache recently and/or frequently accessed data, whether received from host server 102 or proxy server 104. In either case, the cached data may become outdated if host server 102 has more recently updated data. In some embodiments, as described in detail below, proxy service 142 and/or user device 112 may be configured to remove cached data that has become stale, which may cause proxy service 142 and/or user device 112 to request the most up-to-date data (e.g., from host server 102 and/or proxy server 104) because no cached data is available.

FIG. 1 shows a single host server 102, proxy server 104, and user device 112 for ease of illustration, but those of ordinary skill in the art will appreciate that host server 102, proxy server 104, and user device 112 may be embodied in different forms for different implementations. For example, any number of host servers 102, proxy servers 104, and/or user devices 112 may be present on network 100, and each such device, or any subset(s) thereof, may be configured to provide the specific functionalities described herein.

Figure 2:
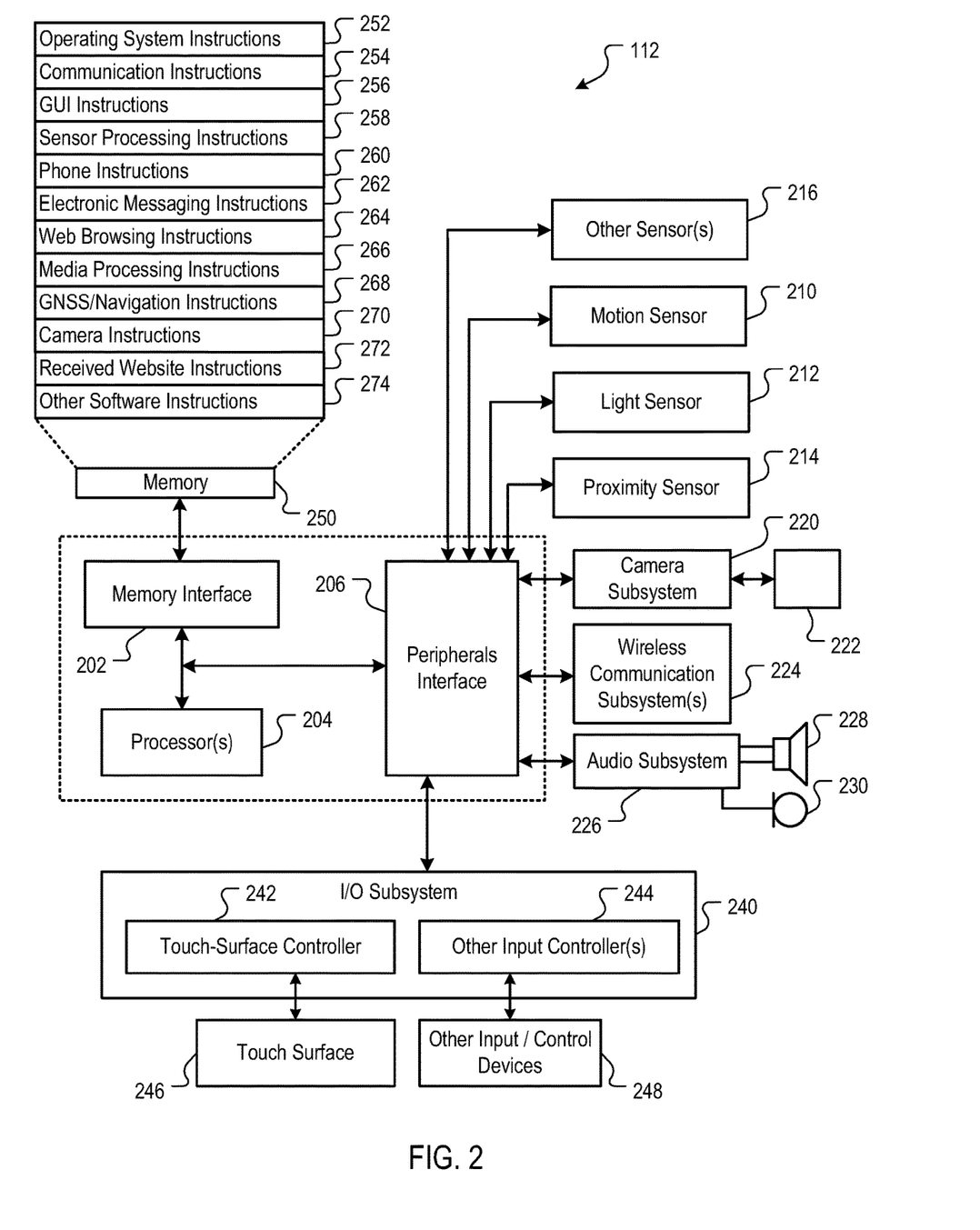
FIG. 2 shows a client device according to an embodiment of the present disclosure.

FIG. 2 shows a block diagram of an example computing device, for example a computing device configured to function as user device 112. User device 112 may include a memory interface 202, one or more data processors, image processors, central processing units 204, and a peripherals interface 206. The memory interface 202, the one or more processors 204, and/or the peripherals interface 206 may be separate components or may be integrated in one or more integrated circuits. The various components in user device 112 may be coupled by one or more communication buses or signal lines.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a global navigation satellite system (GNSS) (e.g., GPS receiver), a temperature sensor, a biometric sensor, magnetometer, or other sensing device, to facilitate related functionalities.

A camera subsystem 220 and an optical sensor 222, e.g., a charged coupled device (CCD) or a complementary metal-oxide semiconductor (CMOS) optical sensor, may be utilized to facilitate camera functions, such as recording photographs and video clips. The camera subsystem 220 and the optical sensor 222 may be used to collect images of a user to be used during authentication of a user, e.g., by performing facial recognition analysis.

Communication functions may be facilitated through one or more wired and/or wireless communication subsystems 224, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 224. The specific design and implementation of the communication subsystems 224 may depend on the communication network(s) over which the user device 112 is intended to operate. For example, the user device 112 may include communication subsystems 224 designed to operate over a GSM network, a GPRS network, an EDGE network, a WiFi or WiMax network, and a Bluetooth™ network. For example, the wireless communication subsystems 224 may include hosting protocols such that the device 120 can be configured as a base station for other wireless devices and/or to provide a WiFi service.

An audio subsystem 226 may be coupled to a speaker 228 and a microphone 230 to facilitate voice-enabled functions, such as speaker recognition, voice replication, digital recording, and telephony functions. The audio subsystem 226 may be configured to facilitate processing voice commands, voiceprinting, and voice authentication, for example.

The I/O subsystem 240 may include a touch-surface controller 242 and/or other input controller(s) 244. The touch-surface controller 242 may be coupled to a touch surface 246. The touch surface 246 and touch-surface controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 246.

The other input controller(s) 244 may be coupled to other input/control devices 248, such as one or more buttons, rocker switches, thumb-wheel, infrared port, USB port, and/or a pointer device such as a stylus. The one or more buttons (not shown) may include an up/down button for volume control of the speaker 228 and/or the microphone 230.

In some implementations, a pressing of the button for a first duration may disengage a lock of the touch surface 246; and a pressing of the button for a second duration that is longer than the first duration may turn power to user device 112 on or off. Pressing the button for a third duration may activate a voice control, or voice command, module that enables the user to speak commands into the microphone 230 to cause the device to execute the spoken command. The user may customize a functionality of one or more of the buttons. The touch surface 246 can, for example, also be used to implement virtual or soft buttons and/or a keyboard.

In some implementations, user device 112 may present recorded audio and/or video files, such as MP3, AAC, and MPEG files. In some implementations, user device 112 may include the functionality of an MP3 player, such as an iPod™. The user device 112 may, therefore, include a 36-pin connector and/or 8-pin connector that is compatible with the iPod. Other input/output and control devices may also be used.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks.

The operating system 252 may include instructions for handling basic system services and for performing hardware dependent tasks. In some implementations, the operating system 252 may be a kernel (e.g., UNIX kernel). In some implementations, the operating system 252 may include instructions for performing voice authentication.

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GNSS/Navigation instructions 268 to facilitate GNSS and navigation-related processes and instructions; and/or camera instructions 270 to facilitate camera-related processes and functions.

The memory 250 may store blockchain instructions 272 to facilitate other processes and functions, such as performing blockchain-related processing (e.g., transactions) and/or message encryption and/or communication that leverages blockchain data as described herein.

The memory 250 may also store other software instructions 274, such as web video instructions to facilitate web video-related processes and functions; and/or web shopping instructions to facilitate web shopping-related processes and functions. In some implementations, the media processing instructions 266 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 250 may include additional instructions or fewer instructions. Furthermore, various functions of the user device 112 may be implemented in hardware and/or in software, including in one or more signal processing and/or application specific integrated circuits.

Figure 3:
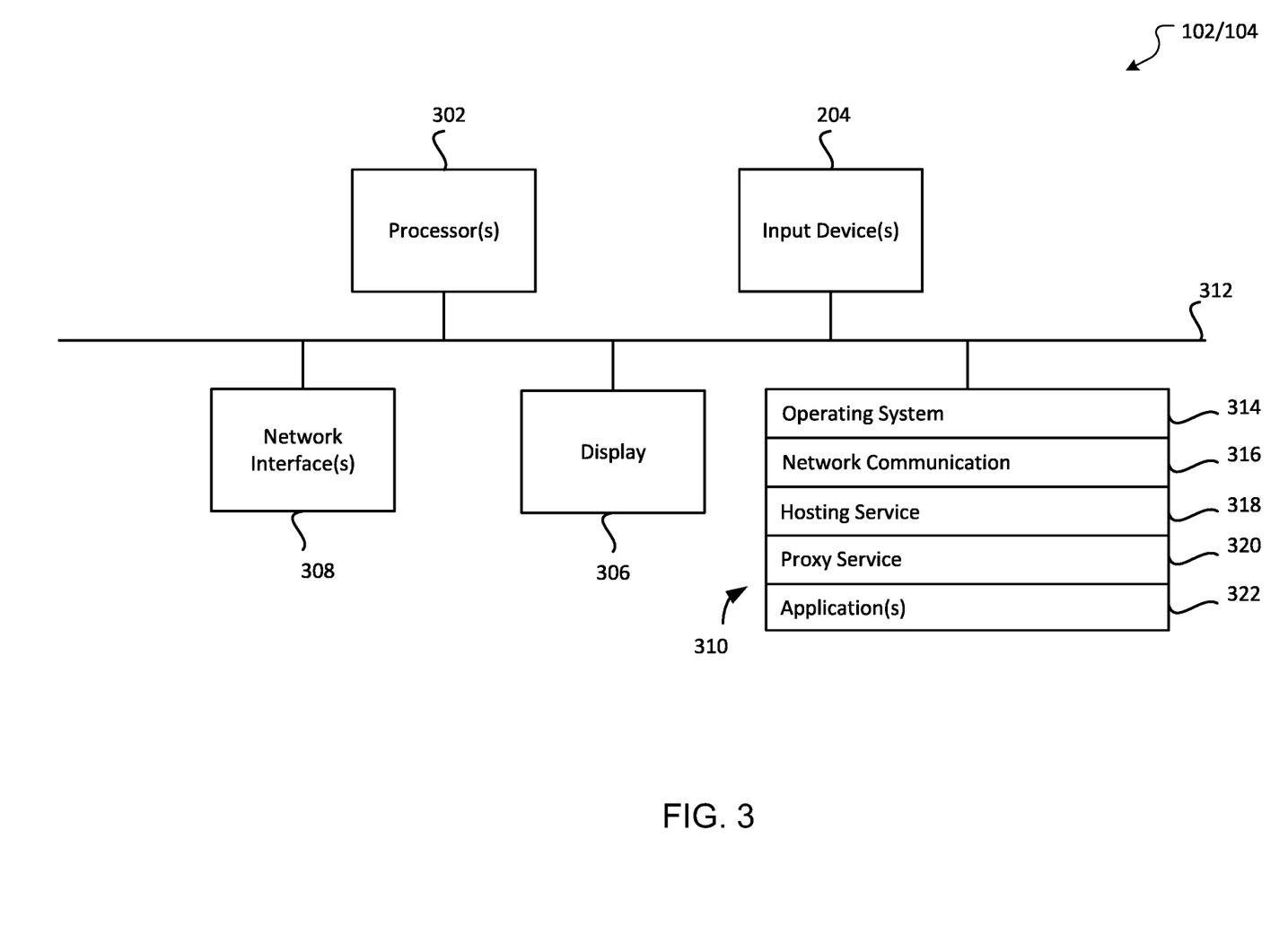
FIG. 3 shows a server device according to an embodiment of the present disclosure.

FIG. 3 is a block diagram of an example server device that may implement various features and processes as described herein. For example, host server 102 and/or proxy server 104 may be configured to have the architecture shown in FIG. 3 in some embodiments. Server device 102/104 may be implemented on any electronic device that runs software applications derived from compiled instructions, including without limitation personal computers, servers, smart phones, media players, electronic tablets, game consoles, email devices, etc. In some implementations, the server device 102/104 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology, including but not limited to ISA, EISA, PCI, PCI Express, NuBus, USB, Serial ATA or FireWire. Computer-readable medium 310 may be any medium that participates in providing instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 310 may include various instructions 314 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/O controller; and managing traffic on bus 312. Network communications instructions 316 may establish and maintain network connections (e.g., software for implementing communication protocols, such as TCP/IP, HTTP, Ethernet, telephony, etc.).

Hosting service instructions 318 may include instructions that perform host server 102 functions as described herein. Proxy service instructions 320 may include instructions that perform proxy server functions 104 as described herein. Application(s) 322 may be an application that uses or implements the processes described herein and/or other processes. The processes may also be implemented in operating system 314.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 4:
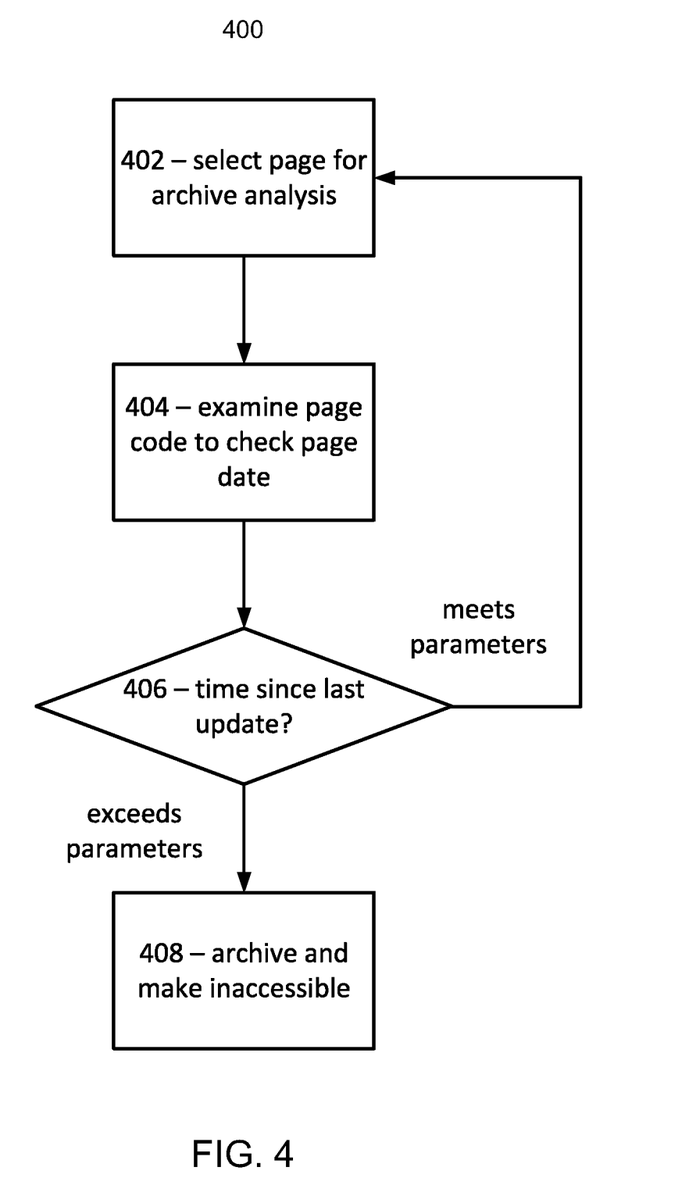
FIG. 4 shows a web page archive process according to an embodiment of the present disclosure.

FIG. 4 shows a web page archive process 400 according to an embodiment of the present disclosure. Host server 102 may perform process 400 to archive outdated data such as web pages. For example, hosting service 122 may perform process 400 periodically and/or upon request to remove old pages from network 100 accessibility and thereby ensure other devices (e.g., proxy server 104 and/or user device 112) do not receive outdated pages.

At 402, host server 102 may select a page for archive analysis. For example, hosting service 122 may crawl through pages hosted by host server 102 (e.g., in a given order such as page URL by alphabetical order). Hosting service 122 may select a first (or next) page to examine.

At 404, host server 102 may check date information for the selected page. For example, each page may include a time stamp indicating when it was created and/or most recently modified. Whenever the page is updated, the time stamp may update to indicate the date and/or time at which the update was saved. Hosting service 122 may examine the page's code (e.g., the HTML code for pages written in HTML) to find the time stamp. In some embodiments, each page may have the time stamp in a similar or same location within its respective code, and/or the time stamp may be labeled to allow hosting service 122 to identify it within the code. For example, the time stamp may be in a header portion of the page.

At 406, host server 102 may compare the time stamp with one or more parameters. For example, hosting service 122 may compare the time stamp with a threshold time for the page specifically and/or a general threshold time. The threshold time may be a time and/or date after which the page is considered to be out of date. In some embodiments, different threshold times may be established for different pages. If the page is not out of date (e.g., because the time stamp is more recent than the threshold time), hosting service 122 may return to 402 and select another page for analysis. If no more pages remain to be analyzed, process 400 may end.

However, if the page is out of date (e.g., because the time stamp is older than the threshold time), hosting service 122 may continue processing. At 408, host server 102 may archive the outdated page. For example, hosting service 122 may store the page in archive 124 and remove it from accessibility by network 100. For example, removing the page from accessibility may include deleting the page at the URL from which it was previously served and/or replacing the data at the URL from which it was previously served with new data. For example, requests for the page may return a "404—not found" error in some embodiments or may redirect to a different URL in other embodiments.

Figure 5:
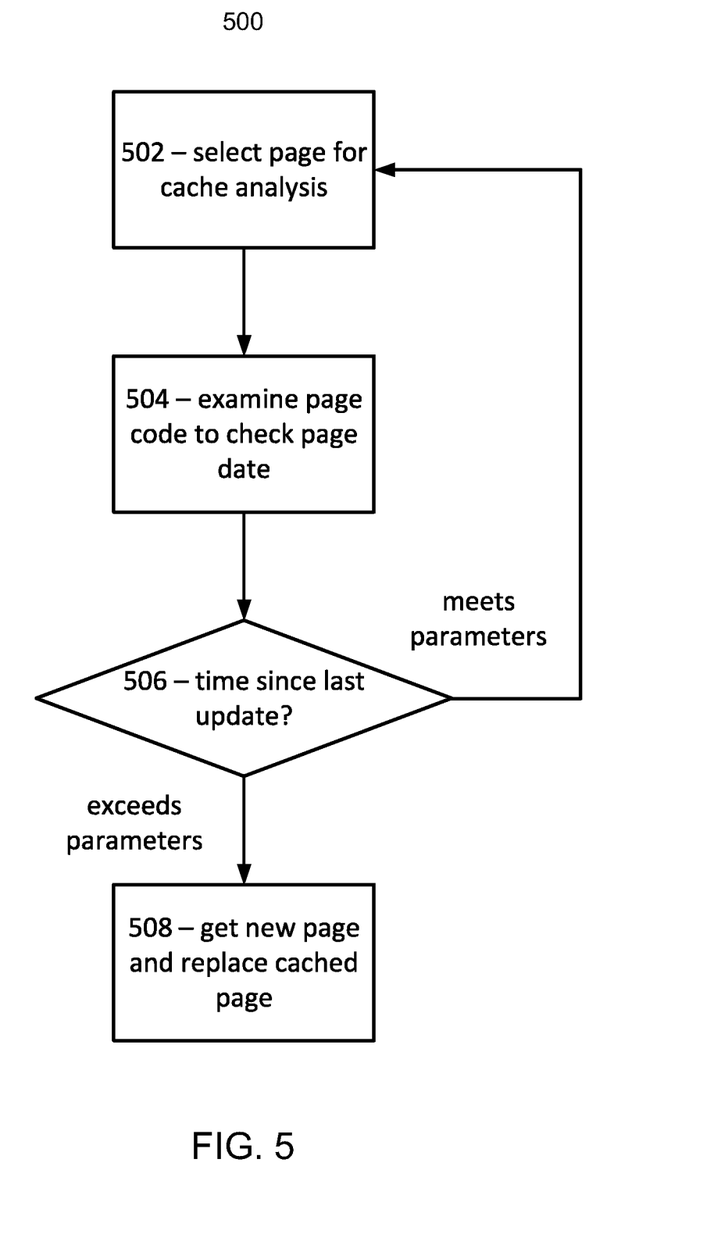
FIG. 5 shows a cache update process according to an embodiment of the present disclosure.

FIG. 5 shows a cache update process 500 according to an embodiment of the present disclosure. Proxy server 102 may perform process 500 to update cached data such as web pages cached by proxy server 102. For example, proxy service 142 may perform process 500 periodically and/or upon request to refresh pages within cache 144 and thereby ensure other devices (e.g., user device 112) do not receive outdated pages.

At 502, proxy server 104 may select a page for cache update analysis. For example, proxy service 142 may crawl through pages stored in cache 144 (e.g., in a given order such as page URL by alphabetical order). Proxy service 142 may select a first (or next) page to examine.

At 504, proxy server 104 may check date information for the selected page. In some embodiments, each page may include a time stamp indicating when it was created and/or most recently modified. Whenever the page is updated, the time stamp may update to indicate the date and/or time at which the update was saved. In some embodiments, the time stamp may indicate when the page was cached by proxy service 142 instead of or in addition to indicating when the page was created and/or modified. Proxy service 142 may examine the page's code (e.g., the HTML code for pages written in HTML) to find the time stamp. In some embodiments, each page may have the time stamp in a similar or same location within its respective code, and/or the time stamp may be labeled to allow proxy service 142 to identify it within the code. For example, the time stamp may be in a header portion of the page.

At 506, proxy server 104 may compare the time stamp with one or more parameters. For example, proxy service 142 may compare the time stamp with a threshold time for the page specifically and/or a general threshold time. The threshold time may be a time and/or date prior to which the page is considered to be out of date. In some embodiments, different threshold times may be established for different pages. If the page is not out of date (e.g., because the time stamp is more recent than the threshold time), proxy service 142 may return to 502 and select another page for analysis. If no more pages remain to be analyzed, process 500 may end.

However, if the page is out of date (e.g., because the time stamp is older than the threshold time), proxy service 142 may continue processing. At 508, proxy server 104 may replace the outdated page. For example, proxy service 142 may request an updated page from host server 102. Host server 102 may send the updated page, which may be received by proxy server 104. Proxy service 142 may replace the outdated page in cache 144 with the newly received page. In some embodiments, the newly received page may have a time stamp indicating when it was created and/or modified when it is received from host server 102. In some embodiments, proxy service 142 may add a time stamp indicating when proxy service 142 stored the page in cache 144.

Figure 6:
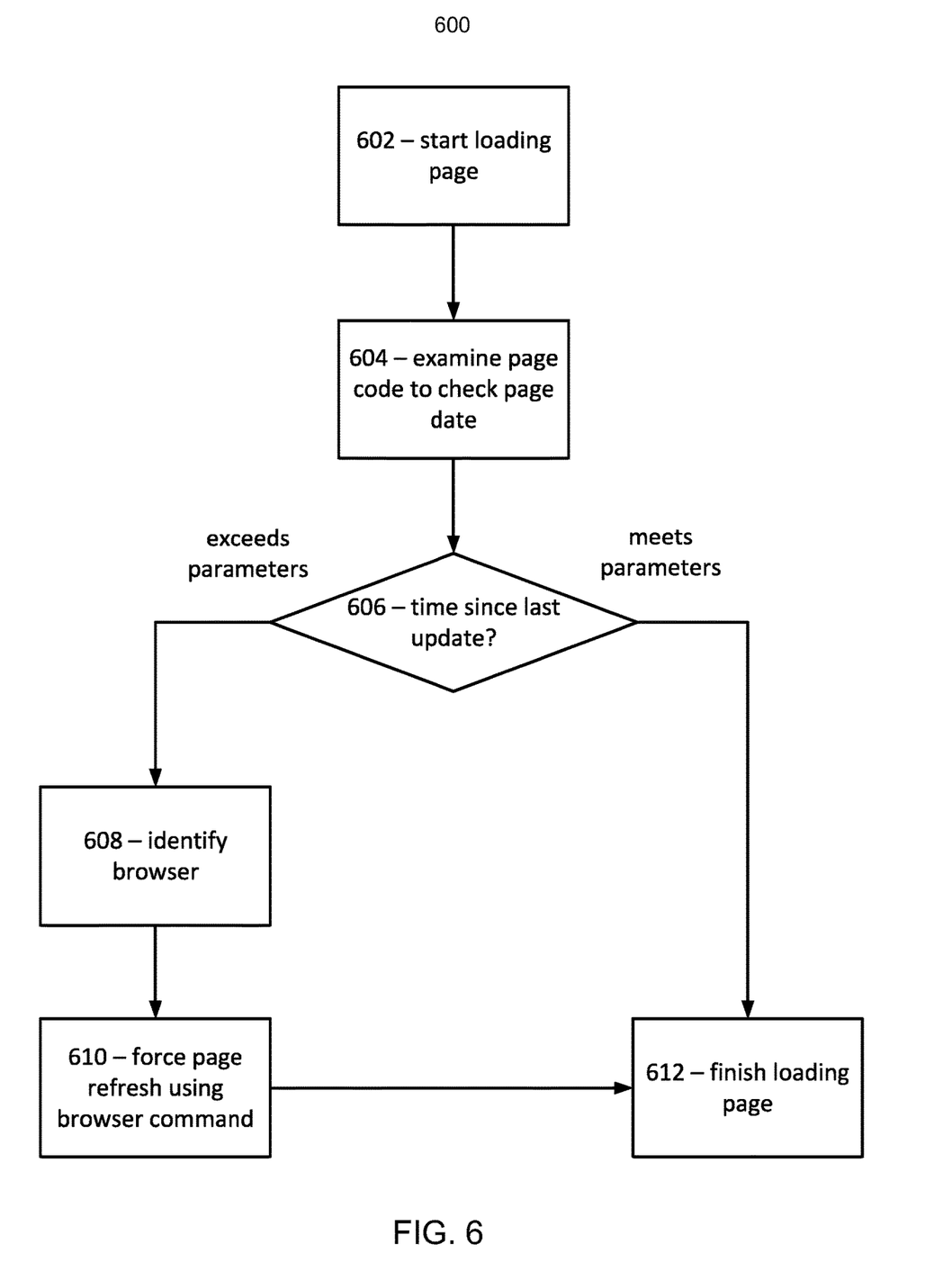
FIG. 6 shows a web page loading process according to an embodiment of the present disclosure.

FIG. 6 shows a web page loading process 600 according to an embodiment of the present disclosure. User device 112 may perform process 600 to update cached data such as web pages cached locally. For example, user device 112 may perform process 600 whenever it attempts to load a page to ensure it does not display outdated pages.

At 602, user device 112 may start loading a page. For example, a user may request a specific page (e.g., by entering a URL into a web browser UI, clicking a link, etc.), and/or an automated process may request a page (e.g., an application executed by user device 112 may request a page upon launch or in coordination with some other automated action, etc.). User device 112 may get and start examining and/or executing code for the page. In some embodiments, at least some remaining portions of process 600 may be performed within the browser attempting to load the page through execution of code embedded in the page itself. In other embodiments, at least some remaining portions of process 600 may be performed through execution of code resident At 604, user device 112 may check date information for the selected page. For example, each page may include a time stamp indicating when it was created and/or most recently modified. Whenever the page is updated, the time stamp may update to indicate the date and/or time at which the update was saved. User device 112 may examine the page's code (e.g., the HTML code for pages written in HTML) to find the time stamp. In some embodiments, each page may have the time stamp in a similar or same location within its respective code, and/or the time stamp may be labeled to allow user device 112 to identify it within the code. For example, the time stamp may be in a header portion of the page.

At 606, user device 112 may compare the time stamp with one or more parameters. For example, user device 112 may compare the time stamp with a threshold time for the page specifically and/or a general threshold time. The threshold time may be a time and/or date prior to which the page is considered to be out of date. In some embodiments, different threshold times may be established for different pages. If the page is not out of date (e.g., because the time stamp is more recent than the threshold time), user device 112 may proceed to 612 and continue loading the page.

However, if the page is out of date (e.g., because the time stamp is older than the threshold time), user device 112 may perform additional processing before continuing to load the page. At 608, user device 112 may identify a browser application that is attempting to load the page. For example, user device 112 may employ one or more open source or proprietary plugins or code within the browser and/or within instructions for process 600 to detect the browser application. For example, the browser application may be Internet Explorer™, Chrome™ Safari™, Opera™, Firefox™, or any other browser application. In some cases, the browser may be a stand alone application, and in other cases, the browser may be integrated into another application. In any case, user device 112 may determine the browser type.

At 610, user device 112 may force a refresh of the page. For example, user device 112 may issue a browser command to refresh the page. In some embodiments, the browser command may be based on a set of one or more keystroke commands that a user may enter to force a refresh in the browser (e.g., a combination of CTRL and R entered at the same time). In some cases, user device 112 may simulate entry of the keystroke commands to force the refresh. User device 112 may enter a specific set of keystroke commands corresponding to the browser application detected at 608, as some browser applications may use different commands to force a refresh. This may cause user device 112 to request and receive new page data from host server 102 and/or proxy server 104.

At 612, user device 112 may finish loading the page. For example, if the page was determined to not be out of date at 606, user device 112 may finish loading the page as initially retrieved from the cache. If the page was refreshed at 610, user device 112 may load the page as received from host server 102 and/or proxy server 104 in response to the refresh request.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A non-transitory computer readable medium storing instructions that, when executed by a processor operating a browser application, cause the processor to perform processing comprising:
   receiving a command to obtain a page made through the browser;
   in response to the command, downloading code for the page, the code for the page including data indicating a time at which the page was most recently updated by a host server that is an original source of the code, the time at which the page was most recently updated being independent of a download time at which the code for the page is downloaded;
   identifying the data within the code for the page indicating the time at which the page was most recently updated;
   determining that the time is earlier than a threshold time for the page;
   forcing retrieval of a new version of the page from the host server in response to the determining, the forcing including:
      selecting at least one browser-based user input command from among a plurality of browser-based user input commands based on an identity of the browser, and
      automatically simulating the at least one browser-based user input command; and
   loading the new version of the page in the browser.

2. The computer readable medium of claim 1, wherein the at least one browser-based user input command includes at least one keystroke.

3. The computer readable medium of claim 1, wherein the instructions, when executed by the processor, further cause the processor to perform processing comprising storing the new version of the page in a cache.

4. The computer readable medium of claim 1, wherein the instructions, when executed by the processor, further cause the processor to perform processing comprising establishing the threshold time for the page.

5. The computer readable medium of claim 1, wherein the threshold time is different from a second threshold time for a second page.

6. The computer readable medium of claim 1, wherein the instructions, when executed by the processor, further cause the processor to perform processing comprising instantiating a plugin within the browser, wherein the plugin is stored in the computer readable medium and includes the instructions that cause the processor to perform at least the forcing.

7. A computing system comprising:
   a processor;
   a transceiver in communication with the processor; and
   a memory in communication with the processor configured to store:
      browser instructions that, when executed by the processor, cause the processor to perform processing comprising:
         receiving a command to obtain a page made through the browser; and
         in response to the command, downloading code for the page from a host server that is an original source of the code using the transceiver, the code for the page including data indicating a time at which the page was most recently updated by the host server, the time at which the page was most recently updated being independent of a download time at which the code for the page is downloaded; and
      page updating instructions that, when executed by the processor, cause the processor to perform processing comprising:
         identifying the data within the code for the page indicating the time at which the page was most recently updated;
         determining that the time is earlier than a threshold time for the page; and
         forcing retrieval of a new version of the page from the host server using the transceiver in response to the determining, the forcing including:
            selecting at least one browser-based user input command from among a plurality of browser-based user input commands based on an identity of the browser, and
            automatically simulating the at least one browser-based user input command;
      wherein the browser instructions, when executed by the processor, further cause the processor to perform processing comprising loading the new version of the page in the browser in response to the forcing.

8. The system of claim 7, wherein the at least one browser-based user input command includes at least one keystroke.

9. The system of claim 7, wherein the browser instructions, when executed by the processor, further cause the processor to perform processing comprising storing the new version of the page in a cache.

10. The system of claim 7, wherein the page updating instructions, when executed by the processor, further cause the processor to perform processing comprising establishing the threshold time for the page.

11. The system of claim 7, wherein the threshold time is different from a second threshold time for a second page.

12. The system of claim 7, wherein the page updating instructions are provided in a plugin loaded within the browser.

13. The system of claim 7, wherein the page updating instructions are a subset of the browser instructions.

14. A computing system comprising:
   a processor;
   a transceiver in communication with the processor; and
   a memory in communication with the processor configured to store instructions that, when executed by the processor, cause the processor to perform processing comprising:
      receiving a command causing caching of the page;

in response to the command, downloading code for the page from a host server that is an original source of the code using the transceiver, the code for the page including data indicating a time at which the page was most recently updated by the host server, the time at which the page was most recently updated being independent of a download time at which the code for the page is downloaded;

storing the code for the page in a cache;

retrieving code for the page from the cache;

identifying the data within the code for the page indicating the time at which the page was most recently updated;

determining that the time is earlier than a threshold time for the page;

retrieving a new version of the page from the host server using the transceiver in response to the determining; and storing the new version of the page in the cache.

15. The system of claim 14, wherein the instructions are configured to cause the processor to perform the retrieving of the code and the identifying periodically.

16. The system of claim 14, wherein the instructions, when executed by the processor, further cause the processor to perform processing comprising establishing the threshold time for the page.

17. The system of claim 14, wherein the threshold time is different from a second threshold time for a second page.

18. The system of claim 14, wherein the instructions, when executed by the processor, further cause the processor to perform processing comprising serving the new version of the page to a client device.

19. The system of claim 18, wherein at least the retrieving of the code and the identifying are performed in response to receiving a request to serve the page from the client device.

20. The system of claim 14, wherein the instructions, when executed by the processor, further cause the processor to perform processing comprising archiving, by the processor, the page in response to the determining, the archiving including making the page unavailable to a client device through a network.

* * * * *